United States Patent [19]

Gegner et al.

[11] Patent Number: 4,565,975
[45] Date of Patent: Jan. 21, 1986

[54] SYNCHRONIZATION OF PULL-IN OSCILLATORS IN THE TRANSMISSION OF DIGITAL SIGNALS

[75] Inventors: Peter Gegner, Munich; Friedemann Vollnhals, Wolfratshausen, both of Fed. Rep. of Germany

[73] Assignee: Siemens Aktiengesellschaft, Berlin & Munich, Fed. Rep. of Germany

[21] Appl. No.: 583,917

[22] Filed: Feb. 27, 1984

[30] Foreign Application Priority Data

Mar. 15, 1983 [DE] Fed. Rep. of Germany ....... 3309270

[51] Int. Cl.$^4$ .......................... H03L 7/14; H04L 7/08
[52] U.S. Cl. ................................... 331/1 A; 178/70 S; 178/70 T; 179/170 A; 179/170 F; 331/14; 331/17; 331/25; 375/120; 455/10
[58] Field of Search ..................... 331/1 A, 14, 17, 25; 455/10, 260, 265; 375/120; 179/170 R, 170 A, 170 F; 178/70 R, 70 J, 70 S, 70 T

[56] References Cited

U.S. PATENT DOCUMENTS 4,135,166  1/1979  Marchetti .............................. 331/14
4,406,919  9/1983  Pospischil ......................... 178/69 G Primary Examiner—Siegfried H. Grimm
Attorney, Agent, or Firm—Thomas H. Jackson

[57] ABSTRACT

Transmission lines for digital signals may include a large number—for example, several hundred—of intermediate generators. In this case, telemetering units are provided at the end points and at intermediate points, by means of which the digital telemetry signals are generated and sent over the transmission lines together with the digital information signals. In the event of interference, a problem arises, due to the fact that the telemetry signal that is needed to identify the interference is only available after a comparatively long time. Therefore, according to the invention, a method is recommended for the initial synchronization, at bit rate, of the pulse generators which generate the bit pulse in the telemetering units. The pulse generation is accomplished with a phase-control loop which generates a signal pulse with a comparatively high frequency. This high frequency is broken down by a resettable frequency divider to the pulse frequency by setting the frequency divider with the first correct sync word recognition. This results in an intermediate synchronization.

2 Claims, 2 Drawing Figures

SYNCHRONIZATION OF PULL-IN OSCILLATORS IN THE TRANSMISSION OF DIGITAL SIGNALS

BACKGROUND OF THE INVENTION

The invention relates to a method of synchronizing pulse generators in the transmission of digital signals that contain a clock pulse, hereinafter an information pulse, and periodically at least one sync word. From the digital signals a first signal pulse that is phase-locked with respect to these signals is generated. Then, from this first signal pulse, by means of a phase-control loop containing a phase comparator and a voltage-controlled oscillator connected with it, a second signal pulse is generated. In addition, the generation of the first signal pulse and the reception of the sync word are monitored. The transmission of digital signals requires, at specified spatial intervals or at digital interfaces, a regeneration of the signal pulses in terms of both amplitude and time. For time regeneration in this case, a pulse signal is required which corresponds in frequency and phase to the pulse signal used by the sender. For this purpose, on the assumption of continuous signal transmission, the required pulse signal is either transmitted parallel to the digital signal on a separate line to the receiving station, or else the digital signal is coded in such a manner that it includes an information pulse. In this case, the information pulse can consist of energy components at a frequency corresponding to the pulse frequency of the digital signals; energy components can also operate at, for example, twice the pulse frequency, with a signal pulse being generated from them at the receiving end. The generation of the signal pulse can be accomplished by means of an oscillating circuit which is tuned to the corresponding frequency; a pull-in pulse oscillator contained in a phase-control loop can also be used. In this case, there are fed to a phase comparator contained in the phase-control loop, on the one hand, a first signal pulse generated from the transmitted digital signals and, on the other hand, the pulse signal that is generated locally. The local pulse oscillator is then pulled in by means of a voltage corresponding to the phase difference of the two signals. The locally generated signal pulse is used for the time regeneration of the digital signals so that the regenerated signals are virtually jitter-free, and the overall transmission of the digital signals is largely free of any interference. As a result of the small band width of the phase-control loop, the synchronization takes a long time. This is especially true when a larger number of intermediate regenerators is used within the transmission line. It is true that even if a pull-in pulse oscillator is not utilized the first signal pulse, which is obtained from the transmitted signals, can be used for the time regeneration, so that the synchronization time is short. However, the first signal pulse—and, as a result, the regenerated signals as well—will exhibit a severe phase jitter, which can accumulate over the line and lead to interference.

The local generation of signal pulse for regeneration by means of a pull-in oscillator is frequently used, because the transmission lines for digital signals are usually constantly in operation, and if the rate of error is very low, it is very seldom necessary to synchronize again after the initial synchronization has taken place. However, difficulties can occur when the digital transmission line is exposed more frequently to interference or glitches or when the time for resynchronization plays a significant part in the overall operation. This is true in the case of addressless monitoring systems for digital long-distance lines; a monitoring system of this kind is described in published U.S. Pat. No. 4,406,919. In this monitoring system, a telemetry signal is transmitted simultaneously over the transmission cable for the digital information signal, in which case an additional telemetering device with a telemetry signal regenerator and a telemetry signal sender is assigned to each line terminal and each intermediate regenerator, for the digital information signal. The transmission of the telemetry signal begins when the telemetering device in the sending line terminal sends out cyclically an initial telegram followed by a final character. In interference-free operation, each telemetering device in the subsequent intermediate regenerators regenerates every telegram received with its final character, and in addition, adds to the end of the last telemetric data received its own telegram with a final character. In this manner a chain of telegrams is created on the way from one telemetering unit to the next, which, in addition to the telegram from the sending line terminal, contains a telegram from every telemetering unit on the monitoring line. The interpretation of the telegrams takes place in a terminating position-finder.

With a view to reporting cases of interference, every telemetering unit is designed in such a manner that when there is a cessation in the reception of telegrams, the telemetering unit, after a specified waiting period, automatically begins to send out cyclically its own telegram followed by the final characters. However, the sending stops immediately, as soon as telegrams start to be received again. In order to regenerate the digital telegrams and to control sending out its own telegram, each telemetering unit contains a pull-in pulse oscillator, which in interference-free operation is synchronized to the pulse of the telemetering unit in the sending line terminal.

In the event of interference or a glitch—for example, if there is a breakdown in an intermediate regenerator—after the expiration of the waiting period, all the telemetering units start to send out their own telegrams. By this means, however, all the telemetering units up to the one after the point of interference again start to receive telegrams, stop sending out their own telegrams and are synchronized to the pulse oscillator of their predecessor. But since this can also be happening at the same time to the predecessor, the result is a series of synchronizing operations, until the individual telemetering units have ultimately been synchronized along the series to the pulse of the first telemetering unit after the point of interference. Accordingly, the time for the synchronization of the remainder of the line amounts to the sum of one waiting period and the number of telemetering units in the remainder of the line, multiplied by the cycle time, which, in practice, is somewhat larger than the time it takes to synchronize an individual pulse oscillator.

In the least favorable situation the interference takes place in the connection to the sending line terminal, so that, for example, on a transmission line with 312 intermediate regenerators with a cycle time of 6.8 seconds and a waiting time of 14 seconds, the time to synchronize the remainder of the line is about 35 minutes. Not until then is the position-finder in a position, by comparing the number of telegrams for the remainder of the line with the predetermined standard, to specify the location of the interference and to give the appropriate alarm. As a result, however, a monitoring system of this kind would not be feasible for digital long-distance systems with high bit rates.

SUMMARY OF THE INVENTION

The object of the present invention is therefore to define a possibility for initial synchronization and resynchronization, at bit rate, of pull-in pulse oscillators, which are used for the transmission of digital signals with a sync pulse.

In accordance with the invention this object is accomplished by the following method: In the phase-control loop there is generated a third signal pulse with a frequency corresponding to a multiple of the pulse frequency of the digital signals. From the third signal pulse, the second pulse is formed by frequency division and it controls the recognition of the sync word. In the event of a glitch that leads to the fade-out of the first signal pulse and/or the sync word, the phase-control loop between the phase comparator and the voltage-controlled oscillator is opened, and the control of the recognition of the sync word is switched from the second signal pulse to the first signal pulse. After the glitch has been eliminated, upon the first recognition of the sync word with the first signal pulse, which is then present, the emission of pulses of the second signal pulse ceases, the phase-control loop between the phase comparator and the voltage-controlled oscillator is closed, and the recognition of the sync word is switched from the first signal pulse to the second signal pulse.

When the method according to the invention is used, the time for resynchronization is shortened to such an extent that virtually upon receipt of the first interference-free sync word, the receiving telemetering unit is already resynchronized.

To bridge longer-lasting interference, it is desirable to use a refinement of the invention, in which, when the phase-control loop is open, a reference signal is applied to the inlet of the voltage-controlled oscillator, and the frequency of the third signal pulse is kept to a medium value.

Other features and advantages of the present invention will become apparent from the following detailed description, and from the claims.

For a full understanding of the present invention, reference should now be made to the following detailed description and to the accompanying drawings.

DETAILED DESCRIPTION

Figure 1:
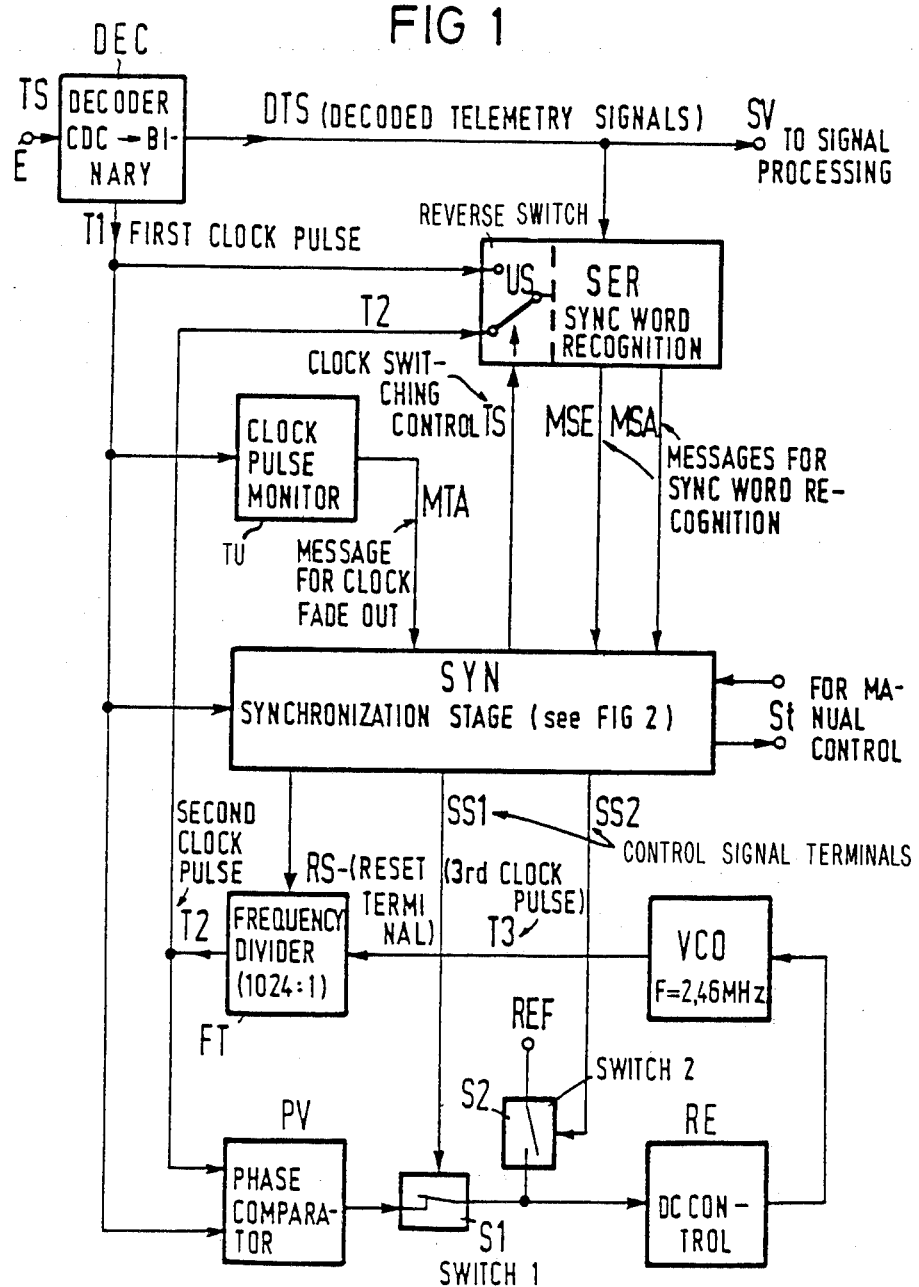
FIG. 1 shows the principal circuit diagram of the part of a telemetering unit that is essential for the synchronization.

In FIG. 1, the letter E is used to designate the inlet for digital telemetry signals TS to which decoder DEC is connected, in which the signals are converted from the CDC (conditional diphase code) that is used as the transmission code into a simple binary code. In addition, by means of an oscillator circuit tuned to the pulse frequency, first clock pulse hereinafter, signal pulse T1 is generated. The decoded telemetry signals DTS are sent from the output of decoder DEC to the signal input of sync word recognition and monitor SER and further devices for signal processing SV. The first signal pulse T1 that is obtained from the transmission signals by the decoding already corresponds, in terms of its pulse frequency, to the pulse signal originally used. Due, however, to phase fluctuations in the transmitted signals, what is involved here is not a synchronous, but merely a plesiochronous or almost synchronous signal pulse. This first pulse signal is fed to a first signal pulse input of sync word recognition SER, to an input of pulse monitor TU, to a pulse input of synchronization stage SYN and to an input of phase comparator PV. Phase comparator PV is part of a phase-control loop, in which there are connected to the output of the phase comparator through first switch S1, control RE, voltage-controlled oscillator VCO and frequency-division stage FT. From frequency-division stage FT, a second signal pulse T2 is generated and fed to a second input of phase comparator PV and a second pulse input of sync word recognition SER. The control voltage generated by phase comparator PV, arrives in interference-free operation, through closed first switch S1 at control RE, which in the present case is designed as a proportional integrator control and generates the actual regulating voltage for voltage controlled oscillator VCO. The opening and closing of switch S1 is controlled by synchronization stage SYN, which sends appropriate signals to the control input of first switch S1 through first control signal terminal SS1. In the case of longer-lasting interference, it is desirable to set voltage-controlled oscillator VCO at a predetermined value. This is accomplished by means of second switch S2, through which reference voltage REF can be applied to the input of control RE. Switch S2 is switched in accordance with the control signals from synchronization stage SYN. These control signals occur at second control signal terminal SS2 and are fed from the latter to the control signal input of second switch S2. Second switch S2 is open in interference-free operation, and the reference voltage can be chosen in such a manner that it simultaneously constitutes the regulating voltage for the voltage-controlled oscillator. In this case, second switch S2 can be connected to the junction between control RE and voltage-controlled oscillator VCO.

The voltage-controlled oscillator generates a third signal pule T3, whose frequency is a multiple of the pulse frequency of the telemetry signals. On the basis of the preset division ratios, frequency divider FT generates second pulse signal T2, which corresponds in terms of frequency and phase to the original signal pulse for the telemetry signals.

If first signal pulse T1 fades out, pulse monitor TU generates a pulse fade-out message MTA, which is fed to an input of the synchronization stage. Correspondingly, when the sync word is correctly recognized, the sync word recognition and monitor SER generates a message MSE; when the sync word disappears, it generates a message MSA. The two message signals are sent to corresponding inlets of synchronization stage SYN. From synchronization stage SYN, signal TS for pulse-switching is sent to the sync word recognition and monitor, by means of which the inner pulse input is switched, in the event of a glitch, by means of reversing switch US, from the terminal for second signal pulse T2 to the terminal for first signal pulse T1. Synchronization stage SYN is also connected with an additional control St, through which, by manual or other means, specific control signals can be applied. The pulse input of synchronization stage SYN is connected to the decoder terminal for first signal pulse T1; reset terminal RS of frequency divider FT is connected with a corresponding control output of synchronization stage SYN.

In interference-free operation, the phase-control loop generates signal pulse T2 that is synchronous with the original sending pulse, the incoming digital signals are detected synchronously, the pulse monitor sends a message to the synchronization stage that there is no pulse fade-out and sync word recognition SER send a message that the sync words are being recognized.

In the event of a glitch, pulse monitor TU reports the fade-out of the pulse, and/or the sync word recognition SER reports the fade-out of the sync word. By means of an appropriate control signal from synchronization stage SYN first switch S1 is opened and second switch S2 is closed; in addition, by means of pulse-switching signal TS, reversing switch US in the sync word recognition SER is switched from the terminal for second signal pulse T2 to the terminal for first signal pulse T1. By this means it is ensured that after the occurrence of first signal pulse T1, the first sync word in either case can be detected or recognized, regardless of the instantaneous phase and frequency of the locally generated second signal pulse T2. At the end of the interference, in other words, when the first signal pulse T1 occurs, the pulse monitor TU sends the message "no pulse fade-out" to synchronization stage SYN; in addition, by means of this pulse signal T1 the first sync word is detected in the sync word recognition SER. Upon receipt of these messages, synchronization stage SYN sends control signals to the first and second switches and also, simultaneously, a reset pulse to reset input RS of frequency divider FT. As a result of the brief reset command to frequency divider FT, at this moment oscillator pulse T3 generated by frequency division is in phase with the instantaneous plesiochronous first signal pulse T1. From this point on, the only task of the phase-control loop is to stabilize the jitter of first signal pulse T1. Since together with reset command RS from the synchronization stage, there is also sent control signal TS for the pulse-switching to reversing switch US of the sync word recognition SER, from this point on the sync word recognition is also in phase with the digital telemetry signals that are received.

Figure 2:
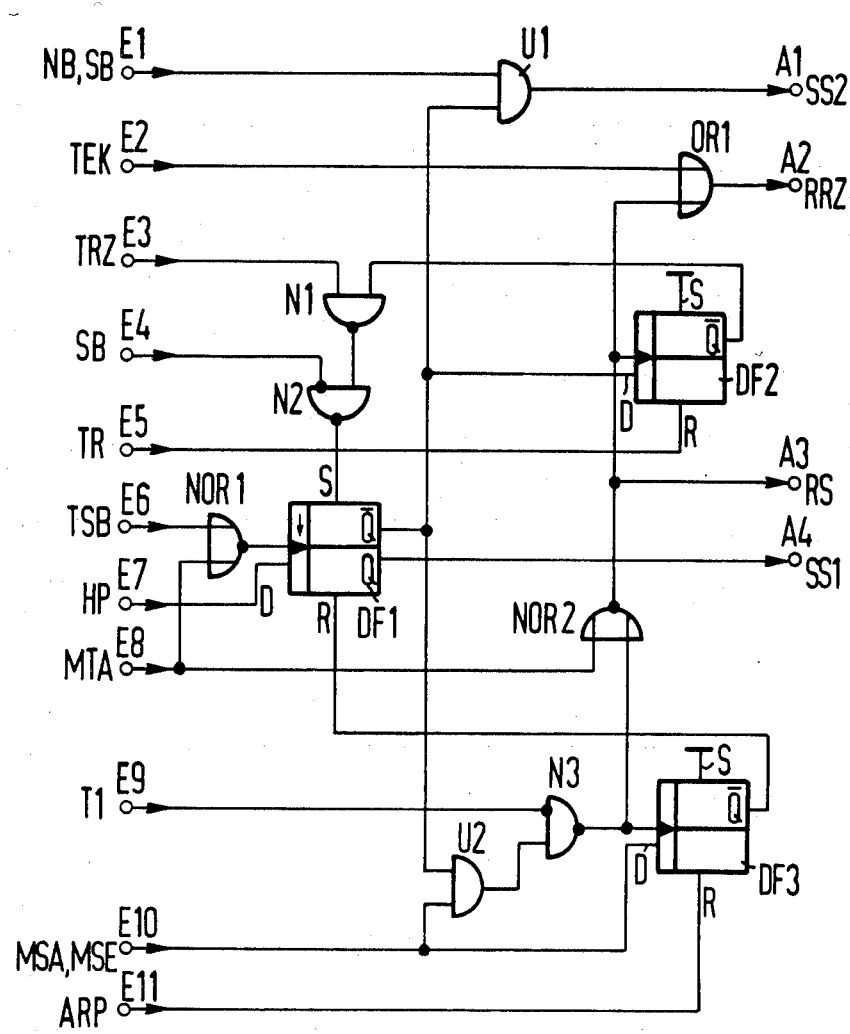
FIG. 2 shows schematically the synchronization stage of FIG. 1.

When frequency divider FT is reset, a phase error in second signal pulse T2 may occur, which corresponds, at its maximum, to the time interval between two pulses of third pulse signal T3. For this reason, the frequency of third signal pulse T3 is selected as a multiple of the required pulse frequency, since the relative phase error that occurs corresponds to the reciprocal of the division ratio of frequency divider FT. Therefore, this error can be kept so small that it is negligible with respect to the occurrence of the jitter. After the switching takes place, the phase deviations of the second signal pulse are damped out, according to the control bandwidth of the phase-control loop, in a relatively short time. There is thus an adjustment, in which the control circuit always remains in the linear range and has a short response time. In FIG. 2, synchronization stage SYN which has already been shown in FIG. 1, is presented in detail with a series of inputs to receive message signals on the left and a series of outputs to send control signals on the right. Synchronization stage SYN contains first input E1, to which, controlled by the telegram interpretation of the telemetering unit, a variable logic level is applied, depending on whether the telemetering unit is in normal operation NB or in start-up operation SB. The latter case implies that interference has occurred in the signal path prior to this telemetering unit, preventing the reception of telegrams. Connected with this first input E1 is the first input of a first AND gate U1, whose output is the first output A1 of the synchronization stage, from which control signal SS2 can be sent to control second switch S2. Second input E2 of the synchronization stage is connected with a telegram recognition device of the telemetering unit, from which it receives a signal as soon as the first telegram of a telegram chain is recognized. With this inlet E2 is connected the one input of a first OR gate, whose output terminal is the second outlet A2 of the synchronization stage, from which signal RRZ can be sent to the frame-counter of the telemetering unit. When the frame-counter is operating, it gives a signal TRZ to third input E3 of the synchronization stage, which arrives at the one input of a first NAND gate N1. The outlet of this gate is connected to the non-inverting input of a second NAND gate N2, whose inverting input is connected to input E4 of synchronization stage SYN. This input is connected to a fixed potential, as long as the respective telemetering unit is running in start-up operation SB, or, in other words, is generating the first telegram of a telegram chain. To the output of the second NAND gate N2 is connected the setting input of first D flipflop DF1 which switches if the pulse edge is negative and whose D input is connected with a seventh input E7 of the synchronization stage SYN, which is connected to the logic one-level HP.

After expiration of the waiting time, corresponding signal TSB is sent by the waiting-time counter in the telemetering unit to the sixth inlet E6 of the synchronization stage, which is connected to an input of the first NOR gate NOR1. The first signal pulse T1 is monitored by the pulse monitor, and, in its absence, a pulse fade-out message MTA is generated and sent through the eighth input E8 of the synchronization stage to the second input of the first NOR gate NOR1 and to the first input of the second NOR gate NOR2. The output of the first NOR gate NOR1 is connected to the pulse input of the first D flipflop DF1, to whose inverting outlet $\bar{Q}$ are connected the D input of a second D flipflop DF2, the second input of the first AND gate U1 and the first input of the second AND gate U2. First signal T1 is received through ninth input E9 of the synchronization stage, and conducted to the inverting input of a third NAND gate N3. The non-inverting input of this gate is connected with the outlet of second AND gate U2, while the output of the third NAND gate N3 is connected with the second input of the second NOR gate NOR2 and with the pulse input of a third D flipflop DF3, which switches when the pulse edge is positive. To the tenth input E10 of the synchronization stage is connected an output of the sync word recognition and monitor SER, to which is sent the message MSA for sync word fade-out or MSE for sync word recognition, as the case may be. These messages are sent on to the second input of the second AND gate U2 and to the D input of the third D flipflop. Finally, for test purposes and for general resetting (for example, after a failure of the operating voltage) an eleventh input E11 of the synchronization stage has been provided, from which a general resetting pulse ARP arrives at reset input R of the third flipflop DF3. Setting input S of this D flipflop is connected with a reference potential, while the resetting input of the first D flipflop DF1 is connected to inverting output $\bar{Q}$ of the third D flip-flop. The non-inverting output Q of the first D flip-flop is the fourth output terminal A4 of the synchronization stage, to which control signal SS1 is applied to control first switch S1. With the output of the second NOR gate NOR2 is connected third output A3 of the synchronization stage, at which the resetting pulse RS for frequency divider FT appears. In addition, this output is connected with the second input of the first OR gate OR1 and with the pulse input of the second D flipflop DF2, in which case this pulse input of the flipflop switches when the pulse edge is positive. The setting input of this flipflop is connected to the reference voltage, while the resetting input is connected to the fifth input E5 of the synchronization stage, and receives a corresponding signal TR from the frame recognition of the telemetering unit when a telegram frame is recognized. Finally, the inverting output $\bar{Q}$ of the second D flipflop is connected with the second input of the first NAND gate N1.

As a result of the linking of the various control commands in the synchronization stage, the synchronization of the pulse oscillator is blocked in the event of interference, and when the interference is over, an initial synchronization at bit rate is ordered, with the assurance that in case of a defective synchronization, this initial synchronization at bit rate will be repeated.

There has thus been shown and described a novel method for the synchronization of pull-in pulse oscillators in the transmission of digital signals, which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for the synchronization of clock generators in the transmission of digital signals which contain clock information and periodically at least one synchronization word, where, from the digital signals, a first clock pulse signal phaselocked relative to these transmitted digital signals is generated, and therefrom, by means of a phase control loop containing a phase comparator and a voltage-controlled oscillator connected therewith, a second clock signal is generated by the fact that first, in the phase control loop, a third clock signal of a frequency corresponding to a multiple of the clock frequency of the transmitted digital signals is generated, and from the third clock signal by frequency division the second clock signal is formed, that, upon a disturbance which leads to a failure of the first clock signal, the operation of the phase control loop between the phase comparator and the voltage-controlled oscillator is interrupted, and that, after elimination of the disturbance, the phase control loop between phase comparator and voltage-controlled oscillator is again closed, characterized by the generation of the second clock signal by means of a resettable frequency divider, that, in normal operation, a means for monitoring the synchronization word of the transmitted digital signals is controlled by the second clock signal, that, in the case of a disturbance of the first clock signal or of the synchronization word, the control of the means for monitoring the synchronization word, in addition to the actuation of the phase control loop, is switched to the first clock signal, and that after elimination of the disturbance, in addition to the closing of the phase control loop with the first recognition of the synchronization word when the first clock signal is present, the delivery of clock pulses of the second clock signal is triggered by a resetting of the frequency divider, and the means for monitoring the synchronization word is again connected to and controlled by the second clock signal.

2. The method of claim 1, further comprising a means for applying a reference signal to the input of the voltage-controlled oscillator when the phase-control loop is open so the frequency of the third clock pulse is kept to a nominal value.

* * * * *